United States Patent [19]
Lygas

[11] Patent Number: 6,111,948
[45] Date of Patent: *Aug. 29, 2000

[54] DIALER FOR SELECTING A CHARACTER

[75] Inventor: Edward A. Lygas, San Marcos, Calif.

[73] Assignees: Sony Corporation, Tokyo, Japan; Sony Electronics Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/027,297
[22] Filed: Feb. 20, 1998
[51] Int. Cl.[7] ................................................ H04M 1/00
[52] U.S. Cl. .......................................... 379/368; 379/433
[58] Field of Search ..................................... 379/368, 433, 379/369, 370; 345/175, 173, 177, 174; 341/31

[56] References Cited

U.S. PATENT DOCUMENTS

3,108,254 10/1963 Dimond .................................... 341/31
5,477,223 12/1995 Destremps ............................... 341/31

Primary Examiner—Jack Chiang
Attorney, Agent, or Firm—Limbach & Limbach L.L.P.; Seong-Kun Oh

[57] ABSTRACT

A method and apparatus for generating a signal indicative of a character in response to the path of a user's input is disclosed. The path of the user's input is detected. In response to this detection a signal indicative of a character is generated. The signal may be received by an electronic device.

20 Claims, 9 Drawing Sheets

| CHARACTERS | U | U-L | U-R | M | L-L | L-R | L |
|---|---|---|---|---|---|---|---|
| 1 |  |  | X |  |  | X |  |
| 2 | X |  | X | X | X |  | X |
| 3 | X |  | X | X |  | X | X |
| 4 |  | X | X | X |  | X |  |
| 5 | X | X |  | X |  | X | X |
| 6 |  | X |  | X | X | X | X |
| 7 | X |  | X |  |  | X |  |
| 8 | X | X | X | X | X | X | X |
| 9 | X | X | X | X |  | X |  |
| 0 | X | X | X |  | X | X | X |
| SEND |  |  |  |  |  | X |  |

DIALER FOR SELECTING A CHARACTER

BACKGROUND OF THE INVENTION

1. Field of the Invention

The present invention relates generally to generating a signal indicative of a character, and in particular to methods and apparatus for generating a signal indicative of a character, where such signal is based upon a user's input.

2. Description of the Related Art

The generation of a signal indicative of a character by a user occurs in many electronic devices. A telephone, for example, requires a user to enter a series of digits in order to place a call. A typical telephone uses a numeric touch pad to allow a user to enter the desired digits. Although some users memorize the position of the digits on the numeric touch pad, most users must look at the touch pad while selecting digits.

Mobile telephones have become increasingly popular for use in an automobile. Here, the use of a touch pad can cause a driver to divert his or her focus from the road. When a driver wishes to place a telephone call, the driver must look at the touch pad in order to enter the desired telephone number. While the driver's focus is directed towards the telephone and dial pad, the driver is unable to properly focus on the road ahead. Consequently, the use of a touch keypad can prove hazardous.

Many designs to reduce the risk of diverting a driver's attention have been implemented. For example, some mobile telephones allow a user to preprogram selected telephone numbers. Then, when a driver wishes to call a particular telephone number, he or she need only press a single button. This reduces the amount of time that a driver's attention is focused away from the road. Still, however, the driver needs to direct his or her focus to the preprogrammed button.

Alternatively, mobile telephones have implemented speech recognition for dialing. Such systems allow a driver to dial a number by speaking to the mobile telephone. The mobile telephone is able to recognize spoken digits and uses the spoken digits to dial a telephone number.

The use of speech recognition in connection with a mobile telephone allows the driver to focus on the road without diverting his or her attention to a touch pad. This greatly reduces the risk that a driver will encounter a road hazard while not focused on the road. Unfortunately, the speech recognition of spoken digits requires complicated and expensive signal processing hardware to implement. The cost of the speech recognition hardware has limited the popularity of mobile telephones which use this technology.

Accordingly, a dialer and a method for selecting a character which avoids diverting a driver's focus from the road and which could be cost-effectively implemented is desired.

SUMMARY OF THE INVENTION

It is an object of the invention to provide a method and apparatus for selecting a character based upon a user's input.

It is a further object of the invention to provide a method and apparatus which avoids diverting a user's focus from other activities.

It is an advantage of the invention to provide a method and apparatus for generating a character which non-visually guides a user's selection of a character.

It is another advantage of the invention to generate a character based upon the path of a user's finger.

It is a feature of the invention to generate characters which represent alpha characters, numeric characters, or control characters.

It is another feature of the invention to generate a signal indicative of a character which may be electronically received by any electronic device.

It is a further feature of the invention to provide a sealed device for receiving a user's input.

According to one aspect of the invention, an apparatus for generating a signal indicative of a character uses a plurality of emitters operative each to emit an interruptable signal, a plurality of receivers, each positioned to receive at least one of the interruptible signals, and a controller coupled to the plurality of receivers operative to generate a signal which indicates a character in response to a plurality of interruptions of the interruptible signals.

According to another aspect of the invention, an apparatus for selecting a character uses a guide for receiving a user's finger wherein the guide defines a plurality of paths, a detector operationally coupled with the guide for detecting a path of a user's finger on the guide, and a controller operationally coupled with the detector wherein the controller receives the path of the user's finger from the detector and selects the character.

According to another aspect of the invention, an apparatus especially suitable for use with a telephone for selecting a digit provides an upper, upper left, upper right, middle, lower left, lower right, and lower path segments configured in a seven-segment structure, and a detector for detecting a user's finger along the path segments.

According to a further aspect of the invention, a character is selected by providing a pad defining a plurality of discrete paths, detecting a path of a user's finger on the plurality of discrete paths, and selecting a character based on the path of the user's finger.

These and other objects, features and advantages will become apparent when considered with reference to the following description and the accompanying drawings.

DETAILED DESCRIPTION OF THE PREFERRED EMBODIMENTS

Figure 1:
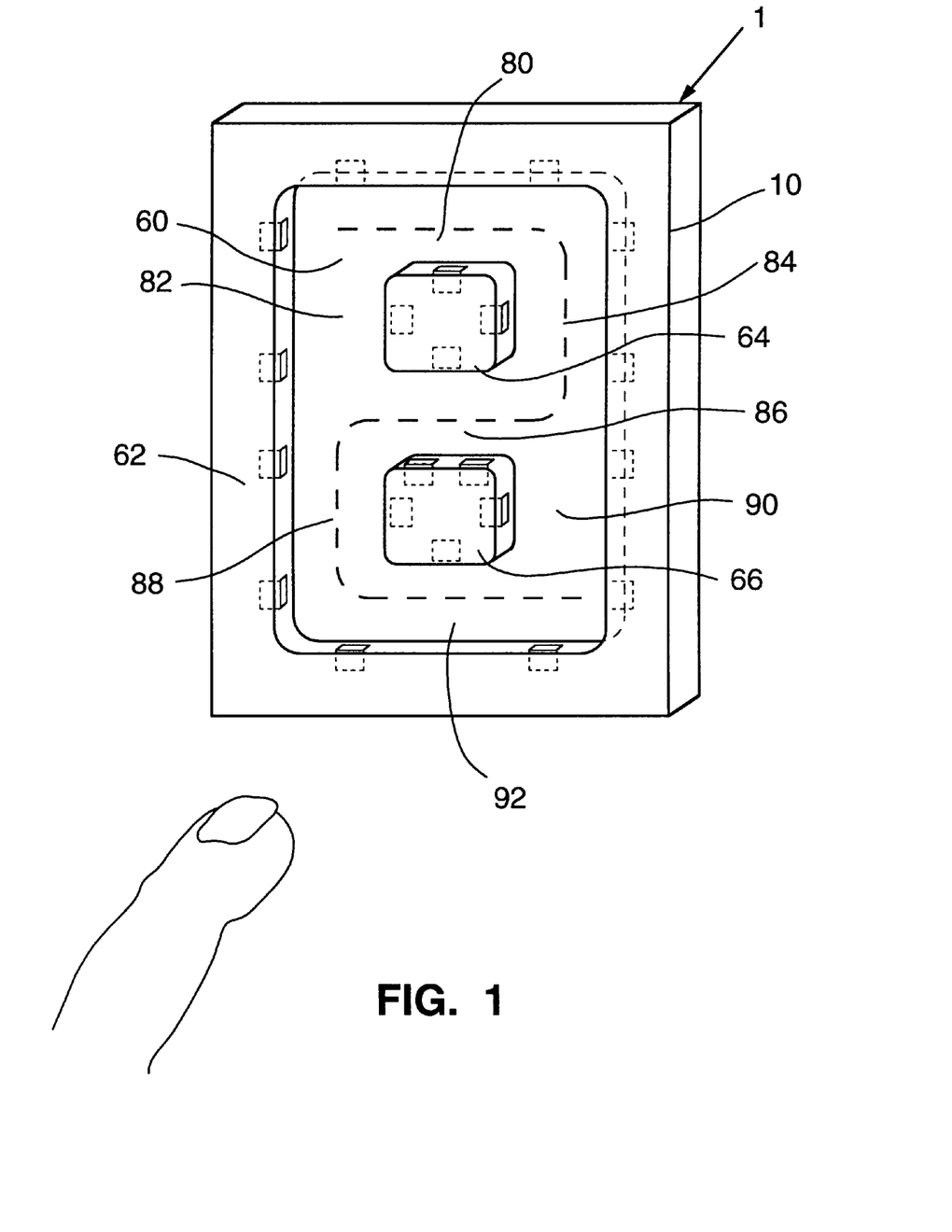
FIG. 1 is a perspective view of a dialer in accordance with the present invention.

With reference now to FIG. 1, a touch dialer 1 for generating a signal indicative of a character in accordance with the invention is now described. The touch dialer 1 includes a housing 10. The housing 10 is configured to accept the components of the touch dialer which will be described below and to allow a user's finger to interact with these components.

The housing 10 is connected to pad 60. Pad 60 defines a surface against which a user may rest his or her finger. The pad 60 is connected to an outer guide 62 which is formed substantially in the shape of a rectangle. The pad 60 is also connected to an upper interior guide 64 and a lower interior guide 66. Both the upper interior guide 64 and the lower interior guide 66 are formed substantially in the shape of a square and both are configured within the boundaries of the outer guide 62. The guides 62, 64, and 66 each protrude from the surface of the pad 60 to define a guide for engaging a user's finger.

The space between the upper interior guide 64 and the outer guide 62 defines an upper path segment 80, an upper left path segment 82, and an upper right path segment 84. The space between the upper interior guide 64 and the lower interior guide 66 defines a middle path segment 86. The space between the lower interior guide 66 and the outer guide 62 defines a lower left path segment 88, and lower right path segment 90, and a lower path segment 92. Together these path segments define a seven segment structure. The outer guide 62 and the interior guides 64 and 66 are configured so that the path segments 80, 82, 84, 86, 88, 90 and 92 which are defined by the guides 62, 64 and 66 may engage a user's finger.

Although the pad 60 and the guides 62, 64 and 66 have been described with a particular structural configuration, various alternative embodiments are envisioned. For example the interior guides 64 and 66 may be configured to have a substantially rounded structure. Likewise, the outer guide 62 may be configured to have a substantially rounded structure. Equivalent alternative embodiments may define seven segment structures or may instead define structures having fewer or more segments.

Although the preferred embodiment utilizes a seven segment structure which is defined by a number of path segments, equivalent alternative embodiments could use a variety of equivalent guides. For example, instead of guiding a user's finger within a channel, a touch dialer according to the present invention could alternatively guide the user's finger by providing a plurality of protrusions or tracks which extend from the pad 60 and which guide the user's finger by allowing the user to follow a path on top of the guide or track.

In a preferred embodiment, pad 60, guides 62, 64 and 66 are constructed of plastic. In addition, the guides 62, 64 and 66 are imbedded with phosphor so that the guides will phosphorese in the presence of selected radiation such as that from the emitters which will be described below. This allows a user to see the guides in dark environments such as the interior of a car at night.

Figure 2:
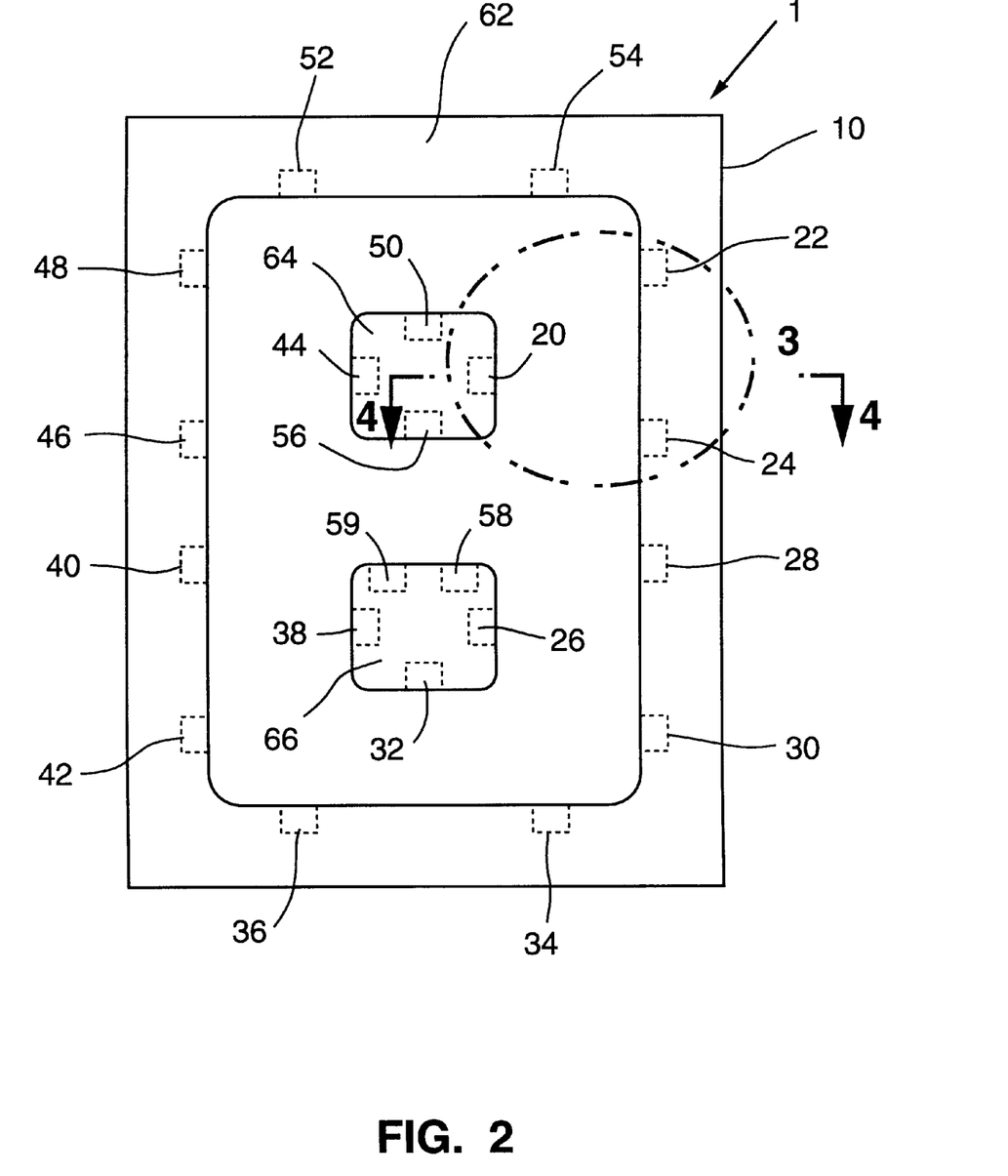
FIG. 2 is a perspective view of the dialer of FIG. 1 which illustrates emitters and receivers not shown in FIG. 1.

Turning now to FIG. 2, the touch dialer 1 of FIG. 1 is shown. The touch dialer 1 includes an emitter 20 which is mounted within the upper interior guide 64. The touch dialer 1 also includes receiver 22 and receiver 24. Receiver 22 and 24 are mounted within the outer guide 62 and are configured to face the emitter 20. Glancing back to FIG. 1, the emitter is configured to radiate across the upper right path segment 84.

The touch dialer 1 of FIG. 2 includes an emitter 26. Emitter 26 is mounted within the lower interior guide 66. The touch dialer 1 includes receivers 28 and 30. Receivers 28 and 30 are mounted within the outer guide 62 and are configured to face the emitter 26. Glancing back to FIG. 1, emitter 26 is configured to radiate across the lower right path segment 90.

The touch dialer 1 includes emitter 32. Emitter 32 is mounted within the lower interior guide 66. The touch dialer 1 includes receivers 34 and 36. Receivers 34 and 36 are mounted within the outer guide 62 and are configured to face the emitter 32. Glancing back to FIG. 1, emitter 32 is configured to radiate across lower path segment 92.

The touch dialer 1 includes emitter 38 and receivers 40 and 42. Emitter 38 is mounted within the lower interior guide 66. Receivers 40 and 42 are mounted within the outer guide 62 and are configured to face the emitter 38. Glancing back to FIG. 1, emitter 38 is configured to radiate across the lower left path segment 88.

The touch dialer 1 includes emitter 44 and receivers 46 and 48. Emitter 44 is mounted within the upper interior guide. Receivers 46 and 48 are mounted within the outer guide 62 and are configured to face the emitter 44. Glancing back to FIG. 1, emitter 44 is configured to radiate across the upper left path segment 82.

The touch dialer 1 includes emitter 50 and receivers 52 and 54. Emitter 50 is mounted within the upper interior guide 64. Receivers 52 and 54 are mounted within the outer guide 62 and are configured to face the emitter 50. Glancing back to FIG. 1, emitter 50 is configured to radiate across the upper path segment 80.

Touch dialer 1 includes emitter 56 and receivers 58 and 59. Emitter 56 is mounted within the upper interior guide 64 and receivers 58 and 59 are mounted within the lower interior guide 66 and are configured to face the emitter 56. Glancing back to FIG. 1, emitter 56 is configured to radiate across the middle path segment 86.

The above described emitter and receiver groupings are configured so that each of the emitters may be excited to emit a radiation signal such as an infrared signal. The receivers which face the emitters are configured so that they will receive the radiation signal. When a user places his or her finger upon the touch dialer 1 and within any of the path segments, the user's finger blocks the path of the radiation signal from an emitter to a receiver. Thus, by detecting the lack of radiation at the receivers, the touch dialer 1 is able to monitor the position of a user's finger.

In the preferred embodiment the emitters are designed to emit infrared radiation. However, alternative embodiments may use visible light or other forms of radiation to detect the presence of a user's finger. Alternative equivalent embodiments may also reverse the position of the emitters and receivers. Equivalent alternative embodiments may sense capacitance or other measures of the presence of a user's finger upon the touch dialer. Likewise, alternative equivalent embodiments may instead use switches which are activated by the presence of a user's finger upon the guides defined by the touch dialer.

Figure 3:
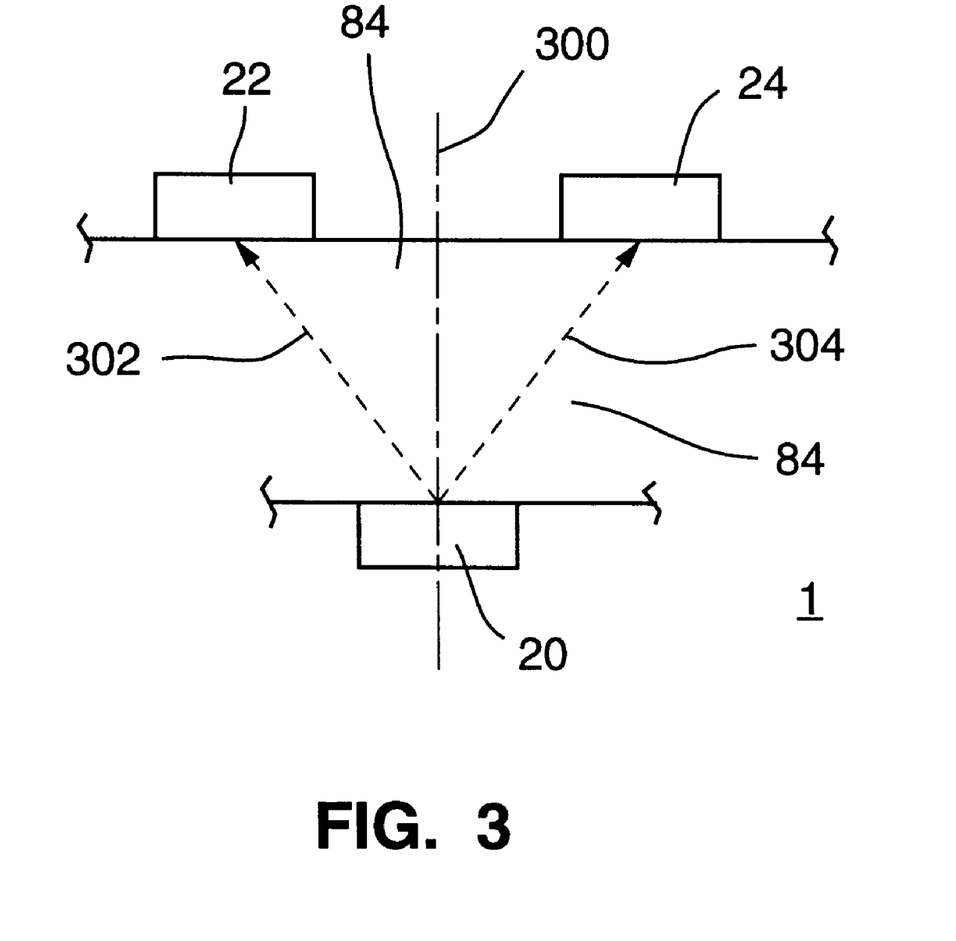
FIG. 3 is an enlarged elevational view of a portion of FIG. 2 including one emitter and two receivers of FIG. 2.

FIG. 3 shows an enlarged elevational view of a portion of the touch dialer 1 of FIG. 2. The emitter 20 defines an axis 300 which extends across the upper right path segment 84. In the preferred embodiment, the emitter 20 concentrates radiation about the axis 300. The receivers 22 and 24 are proximate to the axis 300 so that they may receive the radiated power which is concentrated about the axis 300. Interruptible signal 302 defines a path for power radiated from the emitter 20 to reach the receiver 22. Interruptible signal 304 defines a path from emitter 20 to receiver 24 along which power may be radiated from emitter 20 to receiver 24.

By configuring the emitter 20 and receivers 22 and 24 in the above described arrangement, the touch dialer may effectively sense the presence of a user's finger. When a user's finger moves along the upper right path segment 84, the user's finger sequentially interrupts the signal 302 and the signal 304. By detecting the radiation at the receiver, the touch dialer may effectively determine when a user has moved his or her finger along this upper right path segment 84. By further detecting a user's finger along other path segments, the touch dialer 1 may effectively determine the shape of a path defined by a user's finger and may use the path to select a character.

By using the two receivers 22 and 24 to detect the signal emitted by the emitter 20, the touch dialer 1 is able to more accurately detect the presence of a user's finger. More specifically, the touch dialer avoids spurious detections of accidental interruptions of a single receiver because the user's finger must pass along a specific path. The user's finger must not only interrupt one receiver but must interrupt both receivers while moving along a particular path segment. This avoids the errors which would otherwise result by a user inadvertently touching a single portion of a path segment and thereby interrupting a single signal.

Although the preferred embodiment has been described with a particular arrangement of emitters and receivers, various equivalent alternative embodiments are within the scope of the invention. For example, a touch dialer according to the invention may alternatively use a single receiver for each emitter. Likewise, alternative embodiments of the invention can rearrange the positioning of the emitters and receivers in various other configurations. And, as described above, equivalent alternate embodiments may use other methods for detecting the presence of a user's finger.

The configuration of emitter 20 and receivers 22 and 24 is substantially repeated by the configuration of the other emitter and receiver groupings described above. This configuration allows the touch dialer 1 to avoid spurious interruptions. More specifically, by placing the emitters within the interior guides and by placing the receivers along the exterior guide the receivers are able to detect a more dispersed portion of the radiation pattern. Thus, a user intending to trace a single path segment must cross the radiation portions at both ends of a path segment. This helps to avoid spurious interruptions which might otherwise result from a single receiver which was positioned directly across from the emitter.

Figure 4:
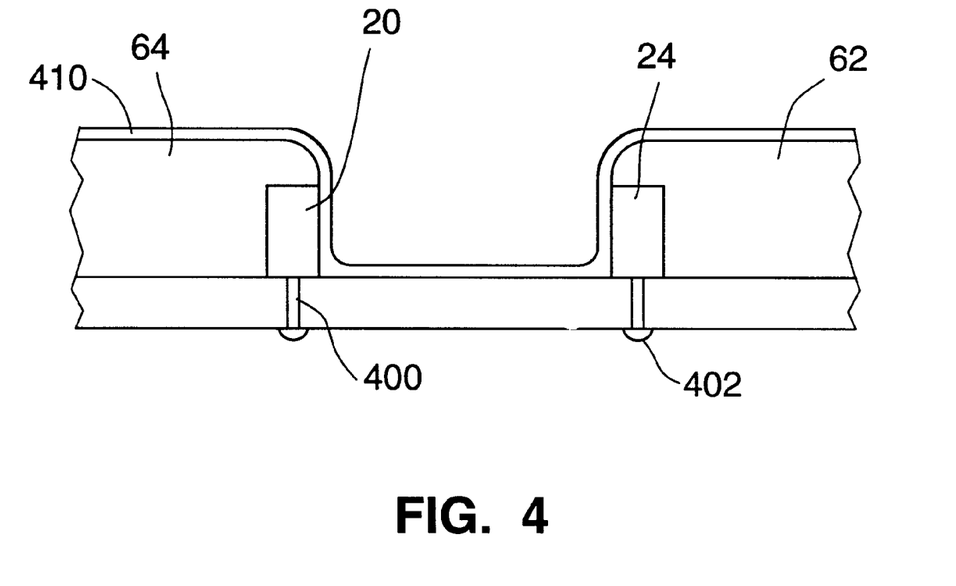
FIG. 4 is a sectional view taken along line 4—4 of FIG. 2.

Turning to FIG. 4, a sectional view taken along lines 4'—4' of FIG. 2 is shown. The emitter 20 is within the upper interior guide 64. The receiver 24 is within the outer guide 62. Electrical connection 400 extends through the pad 60 to connect to the emitter 20. The electrical connection 400 allows the touch dialer 1 to provide a power signal to excite the emitter to produce radiation. The electrical connection 402 extends through the pad 60 to connect to receiver 24. This electrical connection allows a touch dialer 1 to receive an electrical signal from the receiver 24 which indicates the presence of radiation emitted from emitter 20. The other emitters and receivers are similarly configured to allow for connection by the touch dialer 1.

As will be described below, this configuration allows an internal circuit of the touch dialer 1 to connect to the emitters and receivers and to detect a user's finger. Moreover, this configuration provides for a tight seal between the various components. This allows for use of the dialer in hostile environments such as in biohazard and explosive atmospheres. As shown in FIG. 4, the touch dialer may include a protective coating 410, which acts to further seal the various components. When used with infrared emitters and detectors, the coating or seal must be transparent to infrared radiation. The coating may be formed as part of the guides.

Figure 5:
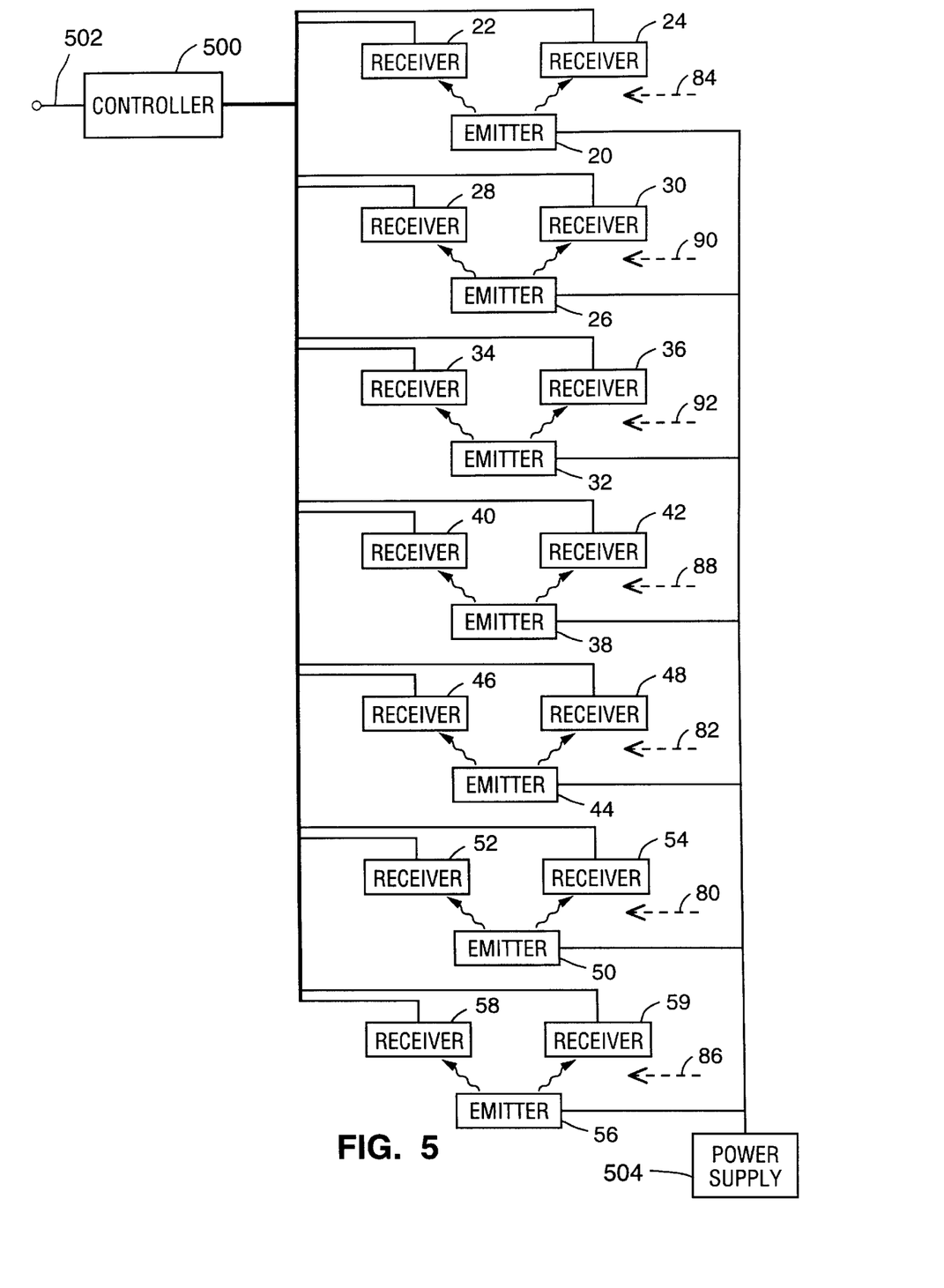
FIG. 5 is a schematic diagram of a touch dialer in accordance with the present invention.

Turning to FIG. 5, a preferred embodiment of a circuit for implementing a touch dialer is shown. The power supply 504 is electrically connected to each of emitters 20, 26, 32, 38, 44, 50, and 56. The power supply provides electrical power to excite the emitters to produce radiation. The receivers 22, 24, 28, 30, 34, 36, 40, 42, 46, 48, 52, 54, 58 and 59 are configured to receive radiation from a single emitter. Each of the receivers is electrically connected to the controller 500. The receivers transduce the radiation from the emitters into an electrical signal which is then transmitted through electrical connections to the controller 500.

As described above, by breaking the path of radiation from the emitters to the receivers, the electrical signal from the receivers to the controller 500 is likewise broken. Thus, the controller 500 is able to detect the presence of a user's finger between the emitters and the receivers along the path segments 80, 82, 84, 86, 88, 90, and 92.

The controller 500 includes an internal processor which uses the electrical signals from the receivers which indicate the path of a user's finger to select a character. The controller 500 also includes a memory for storing information relating to the path of a user's finger and for storing information relating characters to pre-defined paths. A preferred embodiment of this selection is described further below. After selecting a character, the controller 500 outputs a signal on the output bus 502 which is indicative of the character.

Although a preferred embodiment of the touch dialer circuit has been described, various alternative embodiments are envisioned. As those skilled in the art will appreciate various switches and detectors equivalently may be used in place of the above described emitters and receivers to detect the path of a user's finger. Such alternative embodiments are appreciated within the scope of the present invention.

Figure 6:
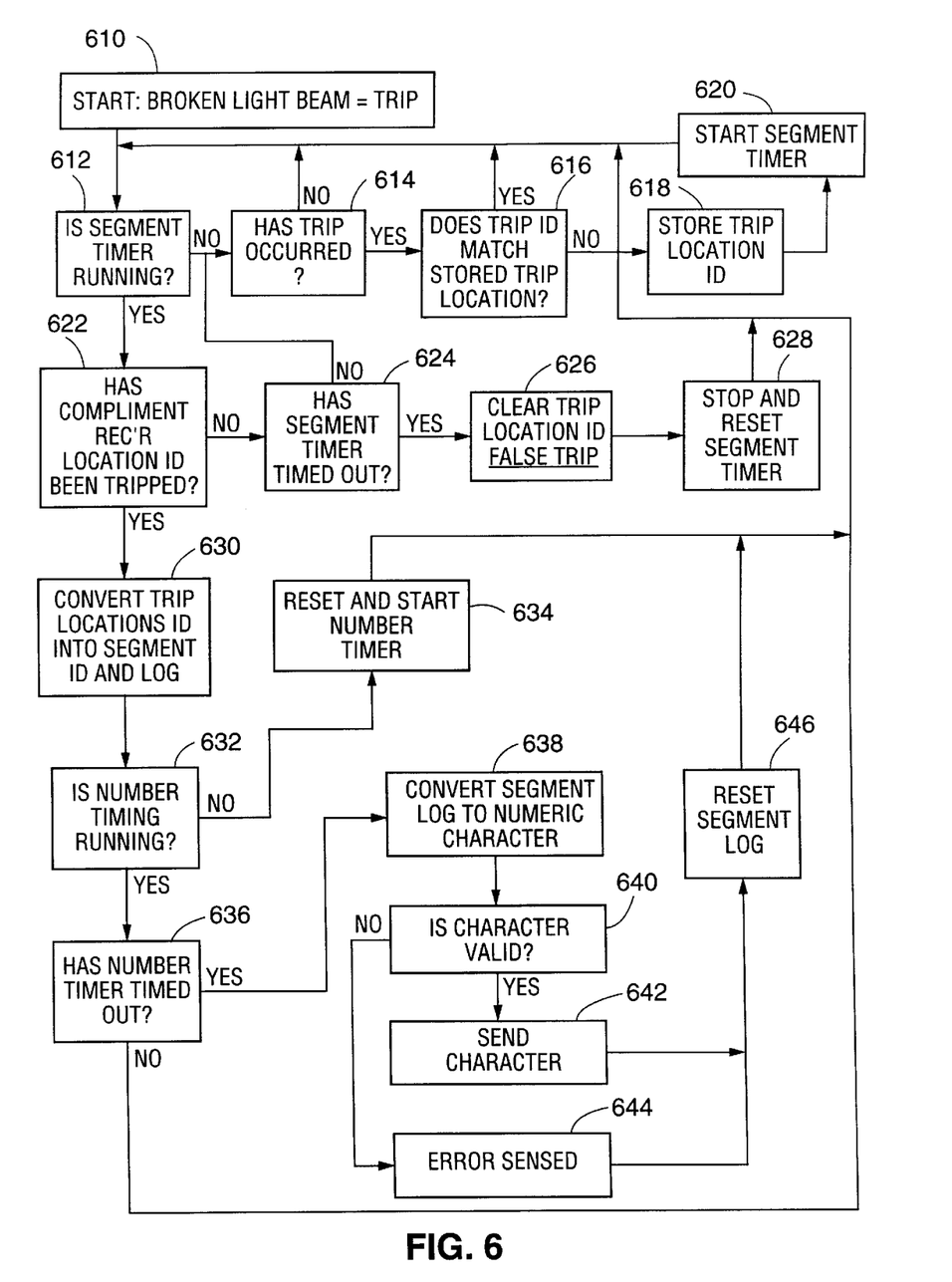
FIG. 6 is a flow chart of a process for generating a signal indicative of a character in accordance with the present invention.

Turning now to FIG. 6, a flow chart for selecting a character based upon the path of a user's finger is shown.

The process begins at start block 610 where the controller 500 waits to detect a first broken light beam or trip. The process proceeds to step 612 where the controller checks whether a segment timer is running. If not, the process proceeds to block 614 where the process checks whether a trip has occurred. If so, the process checks whether the trip location identifier (ID) matches that of a stored trip location ID. Each of the above described receivers will have a unique trip location ID. If the trip location ID does not match that of a stored trip location ID or no trip location ID has been stored, the process proceeds to block 618. The controller 500 then stores the trip location ID of the received trip. The process then proceeds to block 620 where the controller 500 starts the segment timer. The process then returns to block 612.

Since the controller has just started the segment timer, the process proceeds to block 622. The process then tests whether a compliment receiver location ID has been tripped. Receivers along the same segment will have compliment trip location ID's. If not, the process will proceed to block 624 to test whether the segment timer has timed out. If not, the process returns to block 614. The process remains in the loop between blocks 612, 622, 624 and 614 until a trip occurs or the segment timer times out.

Upon detection of another trip, the process proceeds from block 614 to block 616. Again, the controller 500 tests whether the new trip location ID matches a stored trip location ID. The new trip location ID will match that of a stored trip location if a user continues to interrupt a light beam to the same receiver. In such a case the controller 500 will proceed through the above described steps to store the trip location ID at block 618, and then return to block 616 to detect that the same trip location ID is being received. In such cases, the process returns to block 612, and will remain in the loop between blocks 612, 622, 624, 614 and 616 until the user stops setting the same trip or until the segment timer times out.

Alternatively, at block 616, if the trip location ID does not match that of a stored trip ID, the process proceeds to block 618 where the controller 500 stores the trip location ID. The process then restarts the segment timer at block 620 and proceed through block 612 to block 622.

If during the above described process, the controller 500 passes through block 624 to find that the segment timer has timed out, it will then proceed to block 626. Timing out of the segment timer indicates a false trip. This will occur when a user interrupts one receiver along a segment but does not timely interrupt a compliment receiver along the same segment. Accordingly, the controller 500 clears any stored trip location ID. Then, at block 628, the segment timer is stopped and reset before proceeding to block 612 where the process functions as described above.

Returning now to block 622, if compliment trip location ID's have been stored, the process proceeds to block 630 and converts the compliment ID's into a segment ID. The segment ID is then stored in a segment log. The process then proceeds to block 632 where the process tests whether a number timer is running. If not the process proceeds to block 634 to start the number timer. The number timer is used to give a user a fixed amount of time to select a character. The process then returns to block 612, where the process functions as described above.

Returning to block 632, if the number timer is running the controller 500 proceeds to block 636. The controller 500 determines whether the number timer has timed out. If not the controller 500 returns to block 612 to await further input from the user.

If at block 636 the number timer has timed out the controller 500 converts the segment log to a character such as a numeric character. This selection can be made by use of a table such as the one shown in FIG. 7. This table will be discussed in more detail below.

At block 640 the controller tests whether the character is valid. If the segment log does not match the segment entries for any character the controller proceeds to block 644 to indicated that an error has been sensed. The controller 500 then resets the segment log at block 646 and returns to block 612.

If instead at block 640 the controller 500 determines that a valid character has been sensed, the controller proceeds to block 642 to provide a representation of the character. In the above described schematic diagram of FIG. 5, the controller 500 provides an electric representation of the character on output 502. The controller 500 then proceeds to block 646 as described above.

Figure 7:
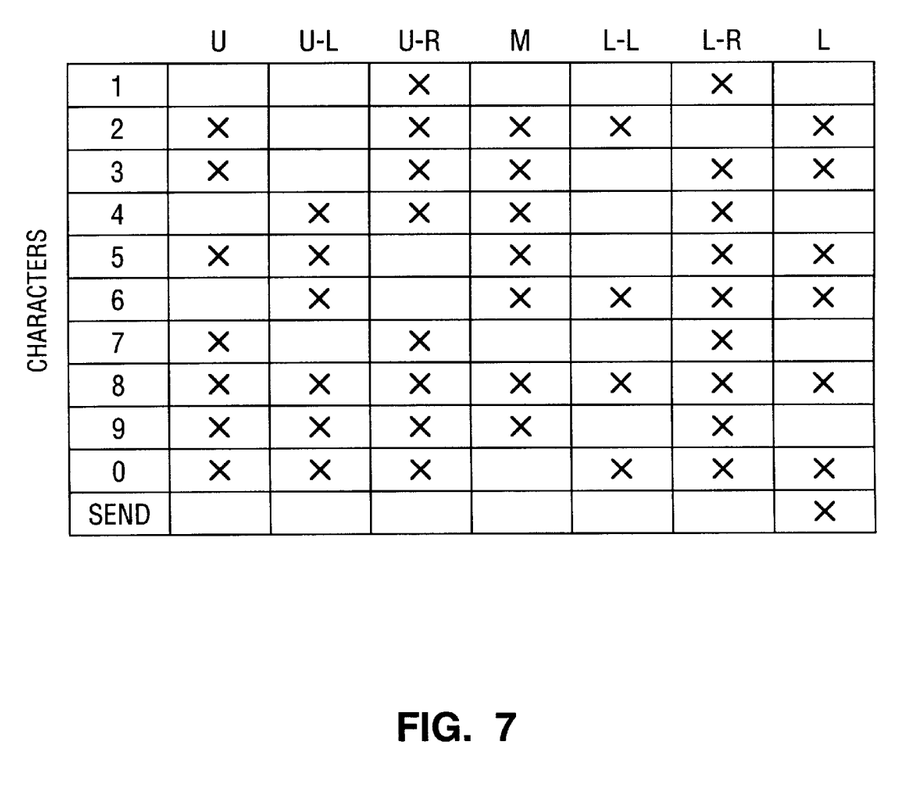
FIG. 7 is a table of a relationship between characters and segments for use in the process of FIG. 6.

Turning to FIG. 7, the table includes a column of characters. As shown the characters include the digits 0–9, and a SEND control character. Each of these characters correspond to a unique group of segments. The segments are listed across the top of the table. The words upper, middle, lower, left and right are each abbreviated by their first letter. Accordingly, U–R represents the upper right segment. The character 1 is, therefore, selected by U–R and L–R segments. The other characters are similarly selected according to the table.

A second preferred embodiment will now be described with reference to FIG. 8. The second embodiment is configured similar to the embodiment of FIG. 2 except that the position of the emitters and receivers are reversed. Along each path segment, two emitters are configured to face a single receiver so that the emitters may radiate power in the direction of the receiver.

Figure 8:
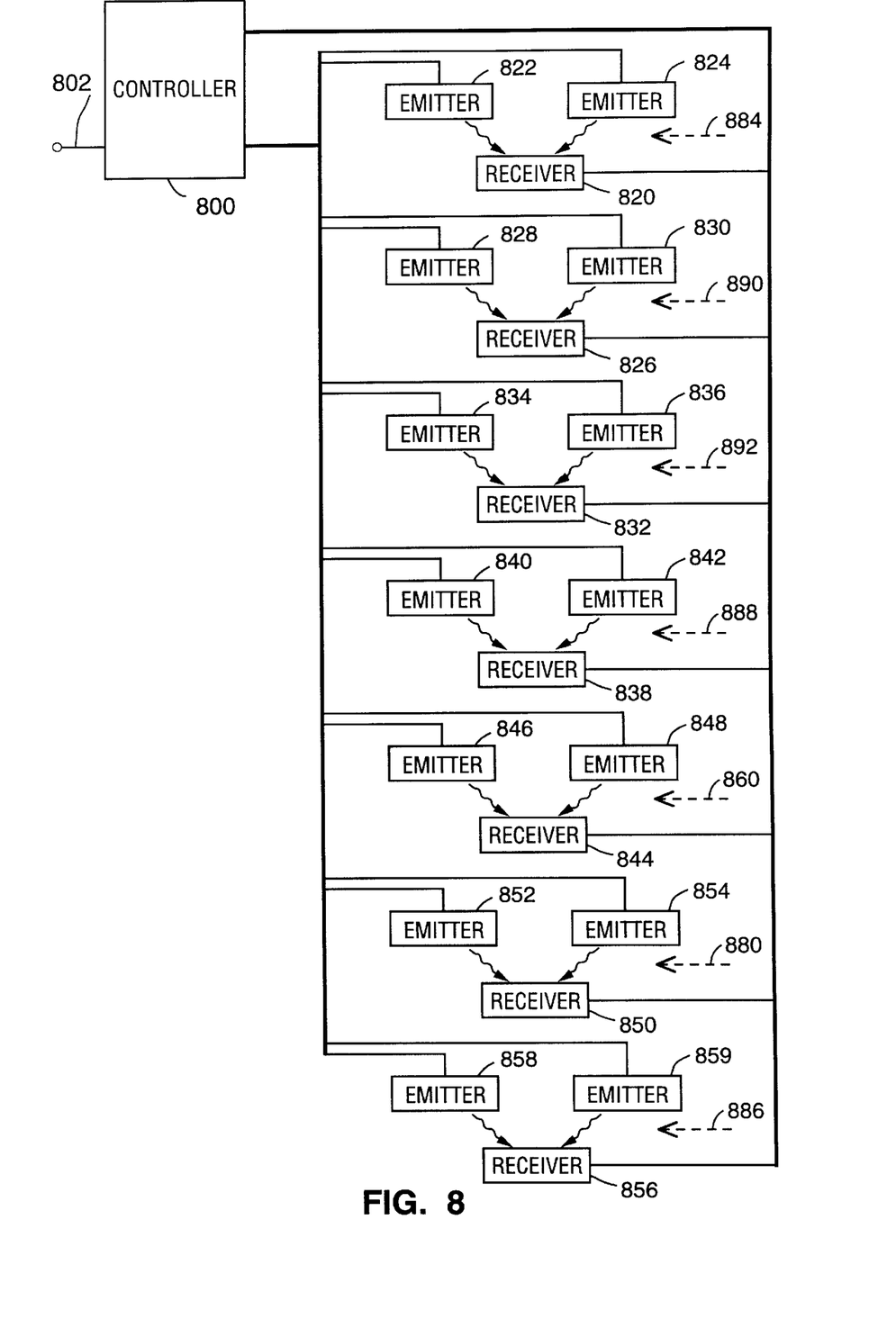
FIG. 8 is a schematic diagram of a touch dialer in accordance with the present invention.

The embodiment of FIG. 8 includes a number of paths for engagement by a user's finger. Movement of a user's finger along these paths may interrupt radiation between an emitter and a receiver. The configuration of the paths, emitters and receivers will now be detailed.

An upper right path segment 884 passes between emitters 852 and 854, and receiver 850. A lower right path segment 882 passes between emitters 828 and 830, and receiver 826. A lower path segment 892 passes between emitters 834 and 836, and receiver 832. A lower left path segment 888 passes between emitters 840 and 842, and receiver 838. An upper left path segment 860 passes between emitters 846 and 848, and receiver 844. An upper path segment 880 passes between emitters 852 and 854, and receiver 850. A middle path segment 886 passes between emitters 858 and 859, and receiver 856.

Figure 9:
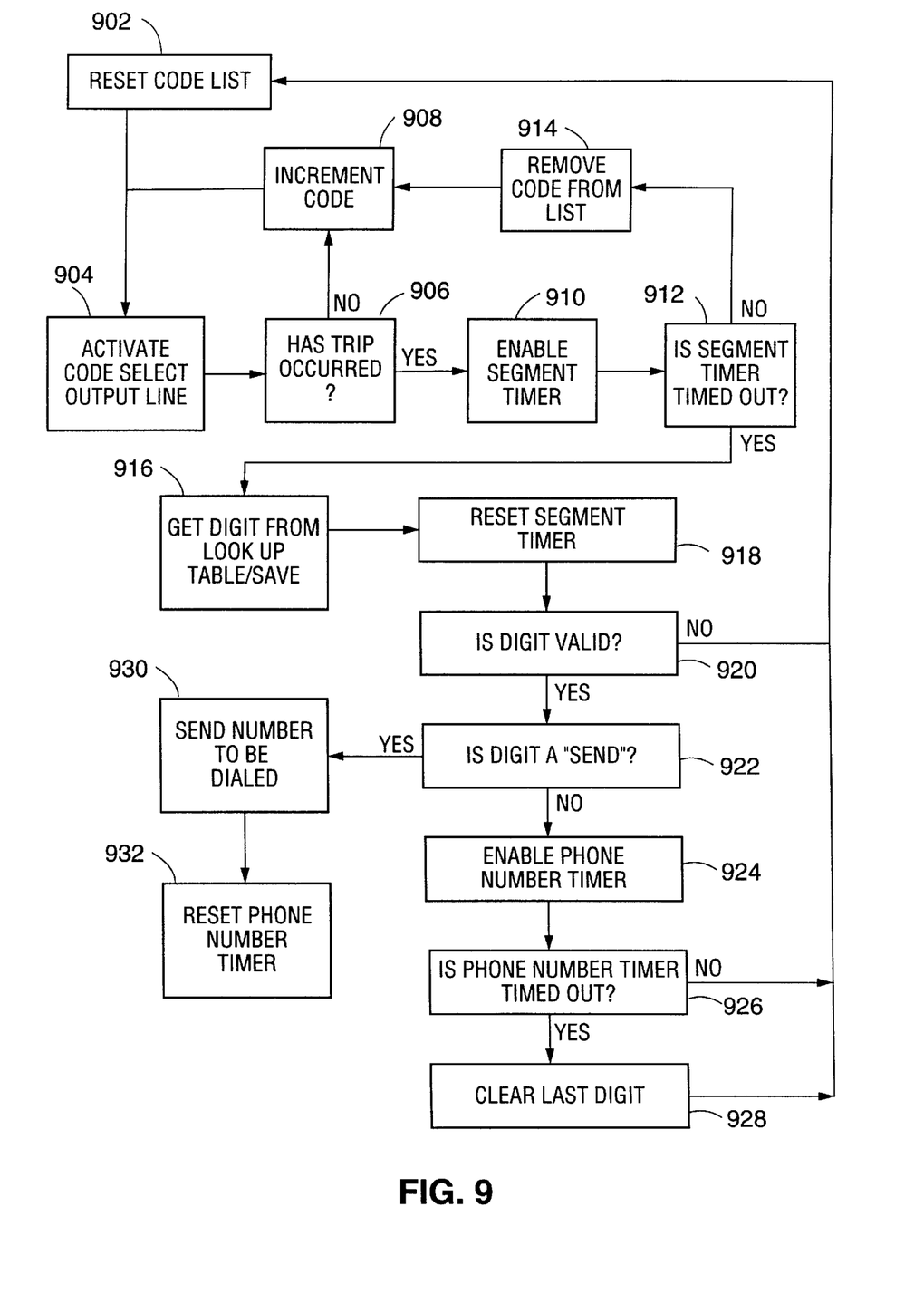
FIG. 9 is a flow chart of a process for generating a signal indicative of a character in accordance with the present invention.

Turning now to FIG. 9, a flow chart for selecting a character based upon the path of a user's finger is shown.

The process begins at block 902. A code list contains identifiers for the emitters along the path segments. At block 902, the controller 800 resets the code list to include all path segments. The controller 800 then proceeds to block 904.

The controller 800 also includes a code pointer which selects one of the emitters on the code list. At block 904, the controller 800 activates the output line which energizes the emitter selected by the code pointer. The controller 800 then proceeds to block 906. Here the controller detects whether a user's finger is interrupting the path between the energized emitter and the facing receiver. If not, the controller 800 determines that a trip has not occurred and proceeds to block 908. Here the controller 800 increments the code pointer to select another emitter on the code list. The controller de-energizes the previously energized emitter and returns to block 904 where the controller 800 activates the output line which energizes the emitter now selected by the code pointer.

The controller 800 will remain in the loop between blocks 904, 906 and 908 until a user causes a trip by interrupting a path between an energized emitter and the facing receiver. In the loop, the controller 800 will sequence between the emitters on the code list, energizing one and detecting a return signal from the facing receiver. If the return signal is detected, indicating a user is not interrupting the path, the controller sequences to the next emitter on the code list.

The controller 800 terminates the loop upon detection of a trip. At block 910, the controller 800 enables a segment timer. The segment timer gives the user a fixed amount of time to complete entry of a single character. If the segment timer is already running, the controller takes no additional action. If the segment timer is not running, the controller 800 starts the segment timer. The controller 800 then proceeds to block 912 to detect whether the segment timer has timed out. If not the controller 800 proceeds to block 914 and removes the identifier for the tripped emitter from the code list. In this way, the controller returns to the loop between blocks 908, 904 and 906 where the controller cycles through the remaining identifiers on the code list.

Returning to block 912, when the controller 800 determines that the segment timer has timed out, it proceeds to block 916. Here the controller removes the identifier for the current and tripped emitter from the code list. The controller 800 then compares the identifiers remaining on the code list to a look-up table such as the one shown in FIG. 7.

Although not shown, the controller 800 also detects whether the segment timer times out while in the loop between blocks 904, 906, and 908. If a user quickly enters a character before the segment timer times out the controller will remain in the loop. However, upon the timing out of the segment timer the controller 800 will jump to block 916 and compare the code list to the look-up table.

The controller 800 proceeds to block 918 to reset the segment timer and then to block 920 to determine whether the entries on the code list match the entries of any character on a look-up table. A match is detected if the identifiers on the code list match the identifiers which would remain for any of the possible characters.

If the code list does not generate a match the controller 800 returns to block 902, resets the code list, and returns to the loop between blocks 904, 906, and 908. Otherwise, the controller 800 adds the character to a list of selected characters. The controller 800 also determines whether the character is a SEND character. If not the controller enables a phone number timer. The phone number timer gives a user a fixed amount of time in which to enter a complete phone number followed by the SEND character. If the phone number timer is already running, the controller 800 takes no action. Otherwise, the controller 800 starts the phone number timer.

The controller then proceeds to block 926. Here, the controller 800 determines whether the phone number timer has timed out. If not the controller returns to block 902, resets the code list, and then enters the loop between blocks 904, 906, and 908. Otherwise, the controller proceeds to block 928 and clears the last character from the list of characters. Block 926 allows a user to remove an unintended character from the list by simply waiting for the phone number timer to expire.

Returning to block 922, if the character is a SEND character, the controller 800 sends the number over output terminal 802. Then, the controller 800 resets the phone number timer at block 932 so that the process may begin again when a user wishes to enter another character sequence.

The above described process can be used to select a digit or a series of digits for use with a cellular telephone. Because the touch dialer does not require that a user direct his or her visual attention to the touch dialer, the touch dialer can be used in a mobile telephone and avoid the hazards of a touch pad. Furthermore, the above desired touch dialer may be implemented using a relatively simple controller and avoids expensive digital signal processing hardware.

In addition to selecting digits, a touch dialer may be used to generate control signals or alpha characters. The control signals may be used by a device such as a mobile telephone in the dialing process. For example, using the touch dialer with a mobile telephone would require the user to first enter a sequence of digits and then enter a control character to command the mobile telephone to send the call.

Although the invention has been described with reference to a mobile telephone, various alternative applications and embodiments are envisioned. The preferred embodiment of the touch dialer can be used with other electronic devices. As those skilled in the art will appreciate, the touch dialer may be used in conjunction with a fax machine, a computer, or many other electronic devices.

Although the embodiments described herein are with reference to a particular configuration of a touch dialer and for use with a telephone, the invention is also applicable to a variety of other applications. The invention may be used to enter characters to any electronic device. Those skilled in the art will appreciate that the embodiments disclosed herein may be modified without departing from the teachings hereof. All such modifications are intended to be encompassed within the following claims.

What is claimed is:

1. An apparatus for selecting a character, the apparatus, comprising:

a guide for receiving a user's finger wherein the guide defines a plurality of paths;

a detector operationally coupled with the guide for detecting a path of a user's finger on the guide, said detector including a plurality of emitters and a plurality of receivers in communication with the emitters, each receiver configured to communicate with two adjacent emitters; and a controller operationally coupled with the detector to receive the path of the user's finger from the detector; wherein when said controller determines said path of said user's finger on the guide corresponds to the character, said controller generates said character.

2. The apparatus according to claim 1, wherein the guide comprises:

a pad defining a plurality of grooves and wherein the grooves form the plurality of paths.

3. The apparatus according to claim 2, wherein the grooves are configured in a seven-segment structure.

4. The apparatus according to claim 1, wherein the guide comprises:

a pad; and a plurality of tracks connected with the pad wherein the tracks form the plurality of paths.

5. The apparatus according to claim 1, wherein the plurality of emitters comprise infrared emitters and the plurality of receivers comprise infrared receivers.

6. The apparatus according to claim 1, wherein the detector comprises a plurality of touch-sensitive switches.

7. The apparatus according to claim 1, wherein the controller comprises:

a memory operationally coupled with the detector for storing the path of the user's finger; and a processor operationally coupled with the memory for comparing the path of the user's finger with a plurality of predefined paths wherein the controller selects the character based on this comparison.

8. The apparatus according to claim 1, wherein the controller receives the path of the user's finger and selects a plurality of characters and a control command.

9. The apparatus according to claim 1, further comprising:

a telephone operationally coupled with the controller wherein the telephone receives the selected character.

10. The apparatus according to claim 1, wherein the guide and the detector are sealed.

11. An apparatus suitable for use with a telephone for selecting a digit, the dialer, comprising:

an upper, upper left, upper right, middle, lower left, lower right, and lower path segments configured in a seven-segment structure;

a detector for detecting a user's finger along the path segments, the detector including a plurality of emitters and a plurality of detectors in communication with the emitters, each detector configured to communicate with two adjacent emitters; and a controller operationally coupled with the detector for selecting a digit based on the detection of the user's finger along the path segments;

wherein when said controller determines that the detection of the user's finger along the path segments corresponds to the digit, said controller generates a signal corresponding to said digit.

12. The apparatus according to claim 11, wherein the controller comprises:

a memory operationally coupled with the detector for storing the path of the user's finger; and a processor operationally coupled with the memory for comparing the path of the user's finger with a table of predefined paths wherein the controller selects the digit based on this comparison.

13. The apparatus of claim 11 wherein the controller selects the digit by comparing the detection of the user's finger along the path segments to a predetermined table of digit paths.

14. The apparatus of claim 11 wherein the detection of a user's finger along the upper right and lower right path segments indicates a one digit;

the detection of a user's finger along the upper, upper right, middle, lower left, and lower path segments indicates a two digit;

the detection of a user's finger along the upper, upper right, middle, lower right, and lower path segments indicates a three digit;

the detection of a user's finger along the upper left, upper right, middle, and lower right path segments indicates a four digit;

the detection of a user's finger along the upper, upper right, middle, lower right, and lower path segments indicates a five digit;

the detection of a user's finger along the upper left, middle, lower left, lower right, and bottom path segments indicates a six digit;

the detection of a user's finger along the upper, upper right, and lower right path segments indicates a seven digit;

the detection of a user's finger along the upper, upper left, upper right, middle, lower left, lower right, and lower path segments indicates an eight digit;

the detection of a user's finger along the upper, upper left, upper right, middle, and lower right path segments indicates a nine digit; and the detection of a user's finger along the upper, upper left, upper right, lower left, lower right, and lower path segments indicates a zero digit.

15. The apparatus of claim 14 wherein the detection of the user's finger along the lower left, lower right, or lower path segments indicates a control command.

16. The apparatus of claim 15 wherein the control command comprises a calling command.

17. The apparatus according to claim 11, wherein the plurality of emitters comprise infrared emitters and the plurality of detectors comprise infrared detectors.

18. The dialer according to claim 11, wherein the detector comprises a plurality of touch-sensitive switches.

19. The telephone dialer according to claim 11, further comprising:

a telephone operationally coupled with the controller wherein the telephone receives the selected digit.

20. The telephone dialer according to claim 11, wherein the detector is sealed within the path segments.

* * * * *